United States Patent [19]

Ernst et al.

[11] 4,435,890

[45] Mar. 13, 1984

[54] METHOD FOR PRODUCTION OF PLASTIC EXTRUSION-COATED BEARING RACES FOR ROLLING BEARINGS AND BEARING RACES PRODUCED THEREBY

[75] Inventors: Horst M. Ernst, Eltingshausen; Manfred Brandenstein, Eussenheim; Lothar Walter; Armin Olschewski, both of Schweinfurt, all of Fed. Rep. of Germany

[73] Assignee: SKF Kugellagerfabriken GmbH, Schweinfurt, Fed. Rep. of Germany

[21] Appl. No.: 372,197

[22] Filed: Apr. 26, 1982

[30] Foreign Application Priority Data

Apr. 30, 1981 [DE] Fed. Rep. of Germany ....... 3117162

[51] Int. Cl.³ ..................... B21D 53/10; B23P 17/00
[52] U.S. Cl. ..................... 29/148.4 R; 29/149.5 NM; 29/149.5 C; 29/412; 29/414
[58] Field of Search ............... 29/148.4 R, 149.5 NM, 29/412, 413, 414, 415, 416, 417, 418, 149.5 C, 149.5 R

[56] References Cited

U.S. PATENT DOCUMENTS 3,516,137  6/1970  Fisher et al. ................... 29/149.5 C
3,693,226  9/1972  Howe, Jr. ...................... 29/148.4 R
4,044,441  8/1977  Morrison ....................... 29/149.5 C Primary Examiner—Howard N. Goldberg
Assistant Examiner—V. K. Rising
Attorney, Agent, or Firm—Eugene E. Renz, Jr.

[57] ABSTRACT

A method for making complementary pairs of race rings for rolling bearing assemblies from a unitary metallic base component formed with the raceways for the rings consisting of the steps of:
  a. forming at least one annular separation seam in the metallic base component defining a bridge which can be severed to form the paired bearing race rings;
  b. hardening the metallic base component;
  c. machining the raceways of the rings simultaneously or successively;
  d. plastic coating the base component to form housing sections adjacent the bearing and side surfaces of the race rings exposing the raceways and separation seam; and
  e. separating the base component at the bridge to form the finished race rings.

A bearing assembly comprising inner and outer ring members formed of a single base component separable at a juncture to define a complementary pair of inner and outer race rings, a plastic housing section for each race ring, at least one of said housing sections including a radially directed flange member retaining the race ring and the rolling elements in an assembled condition.

3 Claims, 4 Drawing Figures

METHOD FOR PRODUCTION OF PLASTIC EXTRUSION-COATED BEARING RACES FOR ROLLING BEARINGS AND BEARING RACES PRODUCED THEREBY

BACKGROUND AND SUMMARY OF THE INVENTION

The present invention relates to a method for making race rings for rolling bearings, specifically angular contact ball bearings. More particularly, the invention relates to a race ring for a bearing of this type which is at least partially plastic coated and produced from a metallic base component comprising an integral connected pair of complementary bearing races; that is, inner and outer rings, which may be formed in one piece and then easily separated or severed to provide the complementary inner and outer race rings for a bearing assembly.

There is shown in German Preliminary Application No. 2,153,597 a method for making rolling bearing races without a plastic coating. The blanks for the rings according to this process have an essentially S or U shaped profile configuration which are shaped in that configuration without cutting. The application does not set forth any provisions for easy separation of the race blanks or their further processing.

Another method for making bearing race rings for angular ball bearings is disclosed in German Preliminary Application No. 1,949,243. In accordance with the teaching of this patent, blanks are machined and then divided at a predetermined location in such a way that either two outer races or two inner races for a ball bearing are produced. It would not be possible to simultaneously produce in pairs consisting of an outer race ring and an inner race ring; and accordingly, in assembling the components of the bearing, the inner and outer race rings must still be selectively adjusted to each other based on dimensional tolerances.

With the foregoing in mind, it is an object of the present invention to provide a method of making plastic coated bearing race rings in complementary pairs wherein the same hardness properties and dimensional relationships are produced for an integral unit which comprises the inner and outer races of a bearing assembly. In this manner the assembly process can be simplified thus reducing expenses, and a high quality bearing is produced.

The method of the present invention consists essentially of the following steps:

a. forming the metallic base component to a generally S-shaped cross section with at least one annular separation juncture or bridge of reduced cross section at a location where after separation of the metallic base component, the separated elements form a complementary pair of bearing races;

b. hardening the metallic base component;

c. machining the raceway surfaces of the inner and outer ring sections of the base component simultaneously or successively;

d. plastic coating by an extrusion process; for example, the metallic base component to form plastic housing sections or enclosures near the bearing and side surfaces of the bearing race rings up to the running raceway surfaces section adjacent the separation juncture or bridge;

e. separating the metallic base component at the juncture or bridge to form the paired bearing rings.

The present process results in production, for example, of inner and outer race rings for an angular contact ball bearing which are integrally produced together up to the final assembly of the rolling elements, such as balls. Formation of the separation seam or juncture facilitates later separation of the rings in an easy and quick manner even in hardened constructions. The narrow connecting land or bridge is formed so that it is adequate or sufficient to withstand the stresses of subsequent processing and can be incorporated from one or both sides of the base component during the initial shaping or forming step without cutting or machining, thereby eliminating additional processing steps and attendant expense needed for this purpose. Furthermore, by forming the metallic base component to form complementary pairs of inner and outer races, during subsequent hardening of the metallic base component, each component has the same characteristics as a result of the simultaneous common processing. This is especially important when case hardening takes place and the inner as well as the outer race ring have the same core hardness, surface hardness, and case hardening thickness. Additionally, the narrow connecting land or bridge has a relatively great hardness in case hardened constructions so that separation at the bridge to form the separated inner and outer ring for a given pair can be accomplished very easily.

Furthermore, by grinding the raceway or running surfaces contacted by the balls of the inner and outer race rings simultaneously, the need for double handling of individual rings is eliminated; for example, clamping twice in a workpiece spindle so that an accurate rotation of both running surfaces is obtained. Additionally, the processing in this way insures a high degree of precision of the raceway or running surfaces dimensionally in relation to one another.

Subsequent to forming the metallic base component in the manner described above and while still in an integral or connected state, the inner and outer rings are placed together in an extrusion mold to form the plastic housing sections near their bearing and side surfaces. The plastic layer or housing for each of the race ring components is split or interrupted adjacent the connecting land or bridge near the running or raceway surfaces. Formation of the plastic housing in this manner also results in a high degree of dimensional precision so that the complementary rings produced are advantageously adjusted to each other with respect to rotation and bearing dimensions.

At this phase of the process, the inner and outer rings of each component may be separated very readily at the hard and thin connecting land or bridge. For example, the inner connected ring components may be simply separated by slight elastic oval deformation of one of the rings or a radial or axial snapping sufficient to break the connecting bridges or lands. The bearing races can then be used without further processing for the assembling of the rolling elements. For maximum precision advantages, the two bearing rings separated from one another are used for one and the same bearing assembly since they complement one another.

In accordance with another feature of the present invention, the separation of the base component assembly at the connecting bridge may be accomplished by snapping the inner race ring in an axial direction by means of the inner ring of another pair of bearing races after insertion of a row of rolling elements such as balls. Consequently, two process steps are combined into one; and the production cost for the assembled bearing can be further reduced. Moreover, it is possible to stack a large number of connected inner and outer ring assemblies and to insert each time a row of balls between the stacked assemblies. Simultaneous separation and final assembly of the pairs is then achieved simply by applying a force, for example, to the inner race ring portion of the assembly at the top of the stack while the outer race ring portion of each assembly is supported at the bottom of the stack. As a result, in a single operation, all inner race rings of the stack are simultaneously separated from the outer races with the balls of each assembly positioned in place between the race rings. If done in this manner, the inner race ring at the bottom of the stack is left over and can be used as the top inner race ring for the next stack, for example.

In accordance with another feature of the bearing assembly made in accordance with the present invention, the housing section for one of the race rings is provided at one axial end with an annular radially directed elastic retaining rim which projects beyond the raceway surface and serves to retain the elements of the bearing assembly as an integral unit and prevent accidental separation thereof after assembly. The retaining rim is constructed in such a way that it does not interfere with the assembly of the components of the bearing since it is elastic and is constructed in its radial dimensions in such a way that it is radially deformed by the axially sliding rows of balls to produce a snap effect when assembling the elements of the bearing assembly. It is noted that shape, dimensions, and elasticity of the retaining rim may be selectively varied depending on the type of bearing assembly. The rim may be provided with an inclined frusto conical surface to provide an easier elastic deformation of the retaining ring by the rolling elements during the assembly process.

Still another feature of the race ring assemblies of the present invention is the provision of radially directed projections circumferentially spaced over the peripheral edge of the metallic base component of the races which serve to anchor the race rings in the plastic housing to prevent relative rotation of the two during operation of the bearing. The projections may also extend through and beyond the plastic bearing housing sections to engage the surfaces of a bore or shaft within which the bearing assembly is mounted to provide in some applications an accurate fit upon installation in a housing bore or on the shaft. Further, even though the present invention has been illustrated and described herein in connection with assemblies comprising a single inner race ring and a single outer race ring, it is, of course, to be understood that two outer races or two inner races in pairs can also be produced according to the method of the present invention and incorporate all of the advantages described above. This method would be particularly suitable for rolling bearing assemblies incorporating two rows of rolling elements, for example, in a double row angular contact ball bearing.

BRIEF DESCRIPTION OF THE DRAWINGS

These and other objects of the present invention and the various features and details of the method and the bearing assembly produced thereby are hereinafter more fully set forth with reference to the accompanying drawings, wherein.

DESCRIPTION OF THE PREFERRED EMBODIMENT

Figure 2:
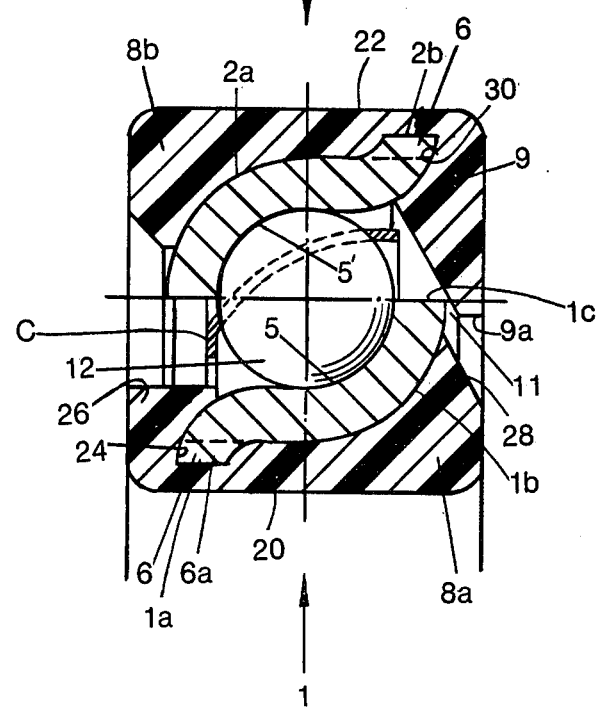
FIG. 2 is a cross section of an angular contact ball bearing assembly after separation of the inner race from the outer race and showing the assembly complete.

Referring now to the drawings and particularly to FIG. 2 thereof, there is illustrated a bearing assembly made in accordance with the present invention. The assembly comprises inner and outer annular race rings 1 and 2 having confronting raceways 5 and 5' which are spaced apart to define an annular space for rolling elements, in the present instance, a plurality of balls 12. As illustrated, the race rings are of generally C-shaped cross section. The assembly further includes a conventional cage C for circumferentially spacing the balls in the bearing envelope. In the present instance, the assembly further includes plastic housing sections 8a and 8b for the inner and outer rings which, as illustrated, partially encapsulate both rings and have outer circumferentially extending generally cylindrical surfaces 20 and 22 for ease of mounting the inner ring 1, for example, on the outer peripheral cylindrical surface of a shaft and the outer ring 2 in the cylindrical bore of a housing. The inner housing section 8a as illustrated has a pocket 24 at one end within which the radially inwardly directed leg 6a of the ring is recessed and which also defines a radially inwardly directed rim 26 at one axial end. The inner terminal edge 1a of the inner ring 1 is preferably provided with a plurality of radially directed projections 6 circumferentially spaced over the circumference of this edge providing a firm rotation proof anchoring in the pocket 24 of the plastic housing section 8a. As illustrated, the housing section 8a confronts and overlies substantially the entire peripheral surface 1b of the inner ring 1 and terminates in a slightly beveled shoulder 28 adjacent the outer terminal edge 1c of the inner ring. The outer ring housing section 8b as illustrated, confronts and overlies substantially the entire outer peripheral surface 2a of the outer ring 2 and wraps around the outer circumferential edge 2b thereof defining a pocket 30 therefor and a radially inwardly directed annular projection or flange 9 which extends radially inwardly beyond the outer raceway surface 5' and has a terminal edge 9a which projects radially inwardly beyond the projection of the outer circumferential edge 1c of the inner ring. This flange 9 serves as a retaining rim for the balls 12 and also forms a gap seal 11 with the inner ring of the angular contact bearing as illustrated. The edge 9a is somewhat flexible at this end, so that as the inner and outer ring sections are moved axially toward one another for assembly, the flange 9 flexes over the outer edge 1c of the inner ring during assembly. For example, assembly may be accomplished by positioning a complement of balls 12 held in an annular array by the cage C in the outer ring 2 and thereafter moving the inner ring 1 axially into place whereby the inner terminal edge 9a of the flange 9 snaps over the outer edge 1c of the inner ring to the position shown in FIG. 2 so that the parts form an integral assembly which may be handled as a unit.

Considering now the method for making a bearing of the type described above, a metallic base component 4 is initially shaped to an S profile and may be made by shaping without cutting, for example, of a pipe section. The annular raceway surfaces 5 and 5' for the inner and outer race rings are shaped simultaneously during this part of the process. Radially directed projection 6 distributed at circumferentially spaced location at the peripheral edges of the S shaped base component are formed and in the center section of the metallic base component annular separation seams or ridges 7 are formed in both sides to define a relatively narrow connecting land or bridge 3 which defines the breakoff juncture between the inner and outer rings. After the shaping process described above, the metallic base component 4 is hardened and subjected to machining and thereafter the raceway surfaces 5 and 5' are machined. In the next step of the process, the metallic base component 4 is extrusion coated with a plastic in one operation to form the housing sections 8a and 8b for the inner and outer ring members. Note that in this operation the area of the raceways 5 and 5' and the area adjacent the center of the S shaped profile near the bridge connection is free of plastic.

Figure 1:
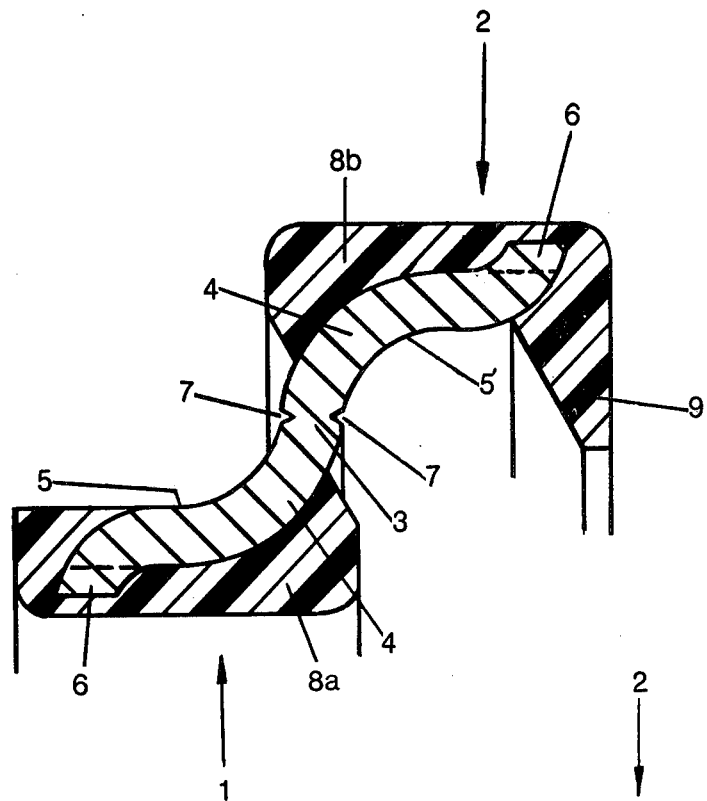
FIG. 1 is a cross sectional view of an inner and outer race ring produced in complementary pairs for an angular contact ball bearing before separation of the metallic base component forming the race rings.
Figure 3:
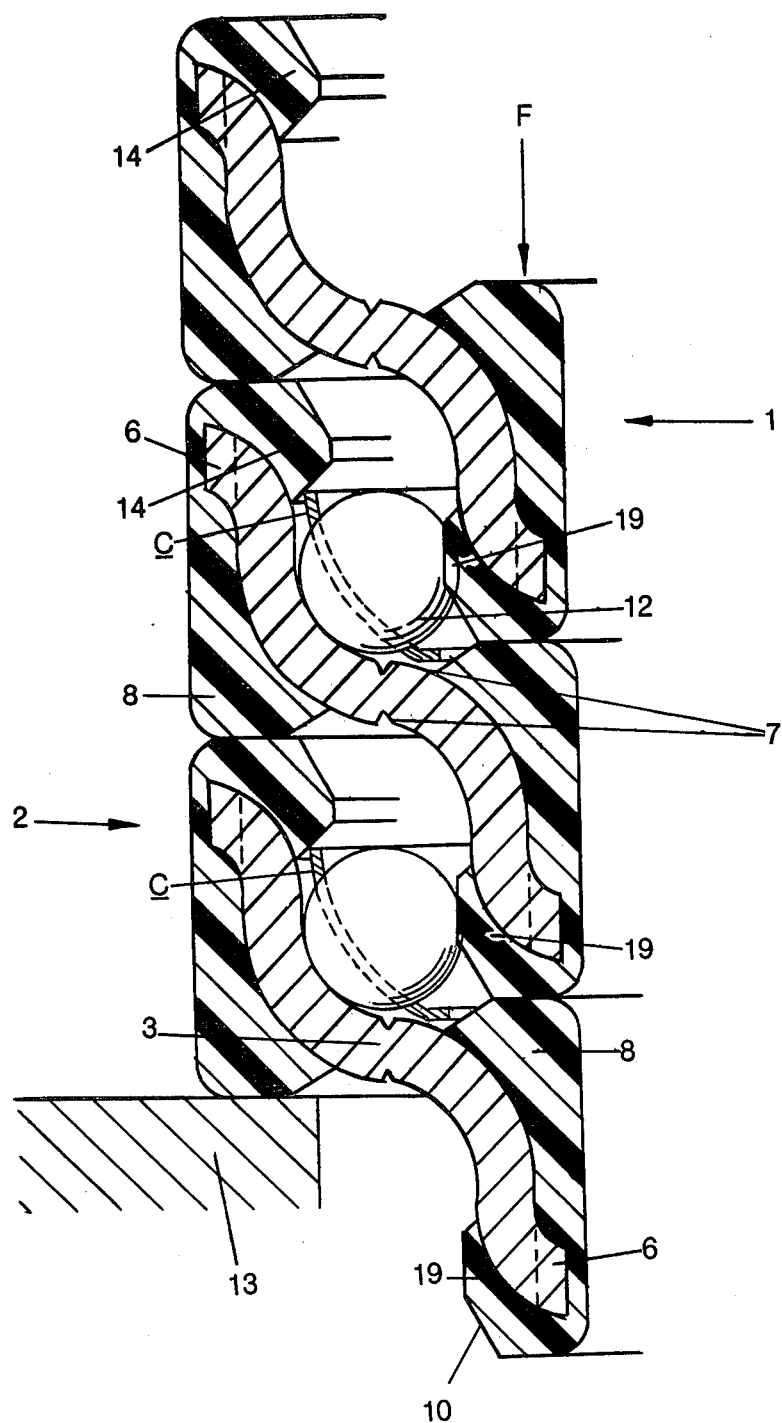
FIG. 3 is a transverse cross sectional view showing a method for separating the inner race ring from the outer race ring of a plurality of assemblies after positioning of the rows of rolling elements, for example, balls.
Figure 4:
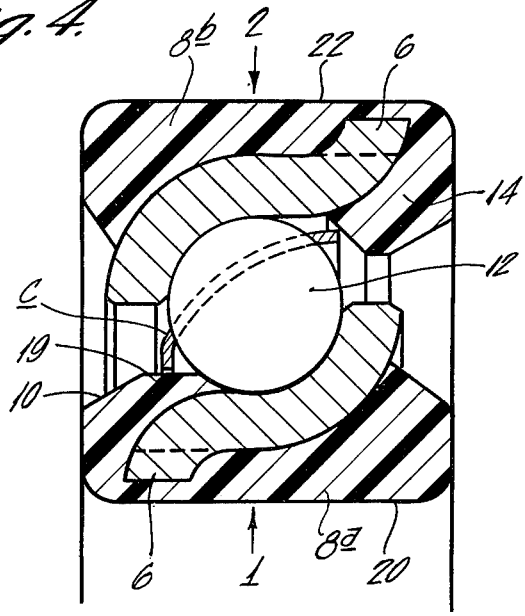
FIG. 4 is a cross section of another embodiment of angular contact ball bearing assembly in accordance with the present invention.

There is illustrated in FIG. 3 another method for assembling bearing assemblies produced in accordance with the present invention. Each of the assemblies illustrated is similar to that shown in FIG. 1 except that the inwardly directed flange 19 at one axial end of the plastic housing section 8a for the inner ring has a radial projection which extends inwardly beyond the axial projection of the inner raceway to serve as a retaining flange at one axial end of the assembled bearing. Also, the opposing flange 14 on the outer housing section projects inwardly beyond the outer raceway but not to the depth of the flange 9 of the outer housing section shown in FIG. 1. As illustrated, the integral raceway assemblies are positioned on a fixed rest 13, a complement of balls retained in an annular array in a cage is then positioned so that it is seated in the raceway of the outer ring. A second assembly is then placed on top of the first and so forth. In other words, several unseparated inner and outer race assemblies are aligned in a stack with the insertion of a row of balls in between each. The uppermost inner race assembly is then engaged with a force F acting downwardly in the direction of the stack axis. Initially the annular radial projections 19 on the inner housing section are elastically deformed by the balls. Note that this section has a tapered outer annular wall portion 10 to facilitate this action. Now with all the races of the stack resting on each other, continued application of the force F breaks the bridge connection 3 between the inner and outer sections of each assembly with an impulse like increase of the force F. The inner race ring sections then come to rest with their raceways 5 engaging the rows of balls 12 and the annular radial projections 19 stretch again elastically and engage as a retaining rim behind the rows of the balls of the now completely assembled individual angular ball bearing assemblies. In order to maintain the sections of the assembly together, the retaining rims 14 at the opposite axial end of the outer section of the bearing assembly prevent accidental breaking up of the bearing; that is, it maintains the inner and outer sections of each assembly in alignment ready for assembly. Note that the bottom inner race section is left over and can be used for the next stack as the inner race for the assembly to be formed at the top of the stack. The insertion of lubricant may, of course, also be included in the process of assembling the bearing.

Even though the present invention has been illustrated and described in connection with angular contact ball bearings, it is to be understood that the advantages of production in pairs of bearing race rings may, of course, be utilized for other types of bearings, for example, roller bearings, or friction bearings.

What is claimed is:

1. A method for making complementary pairs of race rings for rolling bearing assemblies from a unitary metallic base component formed with the raceways for the rings consisting of the steps of:
   a. forming at least one annular separation seam in the metallic base component defining a bridge which can be severed to form the paired bearing race rings;
   b. hardening the metallic base component;
   c. machining the raceways of the rings simultaneously or successively;
   d. plastic coating the base component to form housing sections adjacent the bearing and side surfaces of the race rings exposing the raceways and separation seam; and
   e. separating the base component at the bridge to form the finished race rings.

2. A method as claimed in claim 1 wherein the metallic base component is of generally S-shaped cross section to form the inner and outer race rings for an angular contact ball bearing.

3. A method as claimed in claim 1 for the production in pairs of the inner and outer race rings for an angular contact ball bearing including the step of positioning a complement of balls in position for each of a plurality of assemblies and thereafter separating by snapping the inner race in an axial direction by means of the inner race ring of another pair of bearing races.

* * * * *